United States Patent [19]
Nanko et al.

[11] Patent Number: 5,715,055
[45] Date of Patent: Feb. 3, 1998

[54] SPECTROSCOPE UTILIZING A COUPLER TO CONCURRENTLY APPLY PARALLEL LIGHT BEAMS TO A SAMPLE AND A REFERENCE LIGHT AND PROCESSING THE RESULTING LIGHT BEAMS THEREBY COMPENSATING FOR ENVIRONMENTAL CHANGES

[75] Inventors: Tomoaki Nanko; Takeo Tanaami; Akihiro Murata, all of Tokyo, Japan

[73] Assignee: Yokogawa Electric Corporation, Tokyo, Japan

[21] Appl. No.: 619,951

[22] Filed: Mar. 18, 1996

[30] Foreign Application Priority Data

Mar. 31, 1995 [JP] Japan ................................. 7-074952

[51] Int. Cl.⁶ .................................................. G01B 9/02
[52] U.S. Cl. .................................... 356/346; 356/345
[58] Field of Search ................................ 356/346, 345

[56] References Cited

U.S. PATENT DOCUMENTS

| | | | |
|---|---|---|---|
| 4,538,910 | 9/1985 | Doyle | 356/346 |
| 4,596,466 | 6/1986 | Ulrich | 356/346 |
| 5,212,748 | 5/1993 | Curtiss et al. | 356/346 |

*Primary Examiner*—Samuel A. Turner
*Attorney, Agent, or Firm*—Moonray Kojima

[57] ABSTRACT

A spectroscope comprising an optical fiber placed in a light path to a sample chamber, wherein a light beam outputted from the optical fiber is divided into two using an optical coupler, and wherein the two divided light beams are made incident on a measurement optical fiber and a reference optical fiber, respectively, whereby accuracy of measurement of the spectral characteristics of samples is enhanced because the outgoing light is made incident on the measurement and reference optical fibers concurrently when the light to the sample chamber becomes non-uniform due to environmental changes.

18 Claims, 5 Drawing Sheets

SPECTROSCOPE UTILIZING A COUPLER TO CONCURRENTLY APPLY PARALLEL LIGHT BEAMS TO A SAMPLE AND A REFERENCE LIGHT AND PROCESSING THE RESULTING LIGHT BEAMS THEREBY COMPENSATING FOR ENVIRONMENTAL CHANGES

BACKGROUND OF THE INVENTION

1. Field of Invention

This invention relates to a spectroscope, such as a Fourier-transform type spectroscope, or dispersive spectroscope; and more particularly, to improvements thereof wherein accuracy of the measured data is improved.

2. Discussion of Related Art

Conventional Fourier transform type spectroscopes were arranged to obtain the spectral characteristics of samples by irradiating the samples through an optical fiber, with an outgoing light from a Michelson interferometer on which white light was incident from a white light source (called light source), and by converting the transmitted light from the samples to electrical signals using a photo detetector (called detector) and furthermore processing the signals using Fourier transformation.

FIG. 1 shows an example of a conventional Fourier transform type spectroscope, wherein white light emitted from light source 1 is changed to parallel light, first by optical means 2, which normally uses a lens, and then is made incident on Michelson interferometer 50. The interference light obtained at Michelson interferometer 50 is focused by second optical means 6, which normally uses a lens, and is incident on optical fiber 7. This interference light, after being transmitted through sample 8, is transmitted through optical fiber 9, and then is made incident on detector 10.

In FIG. 1, fixed mirror 4, in Michelson interferometer 50, is fixed and only scanning mirror 5 is moved in the direction of "a–b". A change in the interference signal in that case is measured by detector 10 and is subjected to a Fourier transformation using a Fourier transform converter (not shown) to obtain the spectral characteristics of sample 8.

In such a system, if the characteristics of optical fibers 7 and 9 change due to environmental changes, such as ambient temperature changes, there is a problem in that the measurement is made as though the spectral characteristics of sample 8 are also changed.

A solution to this problem is disclose, for example, in Japan UM 23,243/1995, and is shown herein in FIG. 2 which also is Fourier transform type spectroscope.

The difference between the arrangements of FIGS. 1 and 2 is as follows. In FIG. 2, optical fiber 11 and detector 12 are added. In the position there the image of light source 1 is formed, optical fiber is located close to and along optical fiber 7. Optical fiber 11 is arranged so that it takes the same path of optical fibers 7 and 9, except that there is no sample disposed in its path and its optical characteristic is also the same as optical fibers 7 and 9.

Outgoing light from optical fiber 11 is detected by detector 12 and processed in an identical manner to the interference signal detected by detector 10. In this case, spectral characteristic changes due to environmental changes in optical fiber 11 are included in the spectrum of the interference light detected by detector 12. These changes in optical fiber 11 are considered identical to those in optical fibers 7 and 9 because optical fiber 11 takes the same path as optical fibers 7 and 9. Thus, the environmental changes in the optical fiber can be compensated for by taking the ratio of both interference signal spectra.

However, Michelson interferometer 50 is also subjected to adverse effects, such as temperature changes, and if the internal mirrors become tilted due to such temperature changes, the interference light in the position "d" in FIG. 2 becomes non-uniform. Thus, the problem still remains and results in different characteristics between the interference light incident on optical fiber 7 and the interference light incident on optical fiber 11, and the difference is not compensated for but measured superimposed on the spectral characteristics of sample 8.

In addition, since these two optical fibers 7 and 11 receive light emitted from different parts of light source 1, another problem arises wherein the interference light beams through the two optical fibers 7 and 11 differ due to deterioration of the light source.

This problem also exists in a spectroscope using an acousto-optical device (called AOTF) as shown in FIG. 3, or a spectroscope using a diffraction grating 18, as shown in FIG. 4. Only the part of the spectroscope shown in FIG. 3 which is different from the spectroscope shown in FIG. 2 is next described. AOTF 60 branches the incident light from light source 1 to two light beams because of the birefringence of its crystal. The light beams are made parallel with lens 13 and each parallelized beam is focused with lenses 14 and 15 and is made incident on respective optical fibers 7 and 11. In this case, an arbitrary wavelength or continuous wavelength light can be taken out by changing the frequency of the ultrasonic wave generated by ultrasonic generator 16.

In FIG. 4, light from light source 1 is reflected with concave mirror 17a, applied to diffraction grating 18, and the refracted light is again reflected with concave mirror 17b and is made incident on sample optical fiber 7 end reference optical fiber 11. In addition, the wavelength of the light incident on optical fibers 7 and 11 can be changed by rotating grating 18.

However, even in the foregoing conventional spectroscopes, there is the problem that the light quantity that enters the sample optical fiber and the referenence optical fiber and the spectra change delicately because the AOTF (see FIG. 3) and the diffraction grating (see FIG. 4) deform or move due to temperature changes and/or external vibrations, such as in the Michelson interferometer 50 (see FIGS. 1 and 2).

SUMMARY OF THE INVENTION

Accordingly, an object of the invention is to overcome the aforementioned and other deficiencies and disadvantages of the prior art.

Another object is to provide a spectroscope which can accurately measure the spectral characteristics of samples even when the light from a light source becomes non-uniform due to environmental changes by providing an arrangement wherein after receiving light from the light source through a single optical fiber, the light is caused to be branched through two other optical fibers.

The foregoing and other objects and advantages are attained in the invention which comprises a spectroscope using at least two optical fibers for measurement and reference purposes in the light path to the sample chamber, wherein a first optical fiber is arranged so that its input end is located in the light path to the sample chamber, an optical coupler is provided which divides the light outputted from the first optical fiber into two light beams and makes these two branched light beams incident on the measurement and reference optical fibers, respectively, and first and second detectors are provided to detect the output light from the measurement optical fiber and reference optical fiber, respectively.

By using the foregoing arrangement, the spectral characteristics can be accurately measured since the light beam from the source is made incident concurrently on both the measurement and reference optical fibers, even when the light source becomes non-uniform due to environmental changes.

DETAILED DESCRIPTION OF THE PREFERRED EMBODIMENTS

Figure 1:
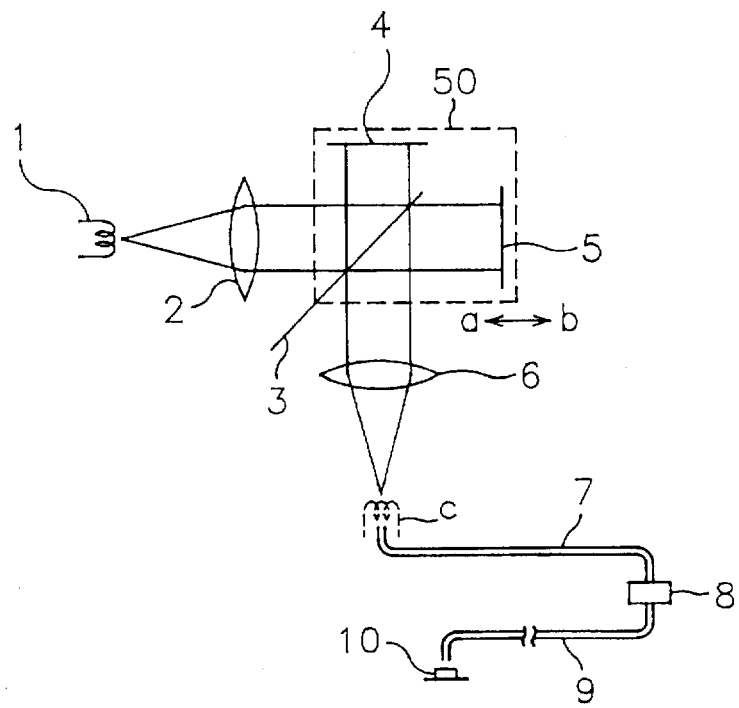
FIG. 1 is a diagram depicting a conventional Fourier transform type spectroscope.
Figure 2:
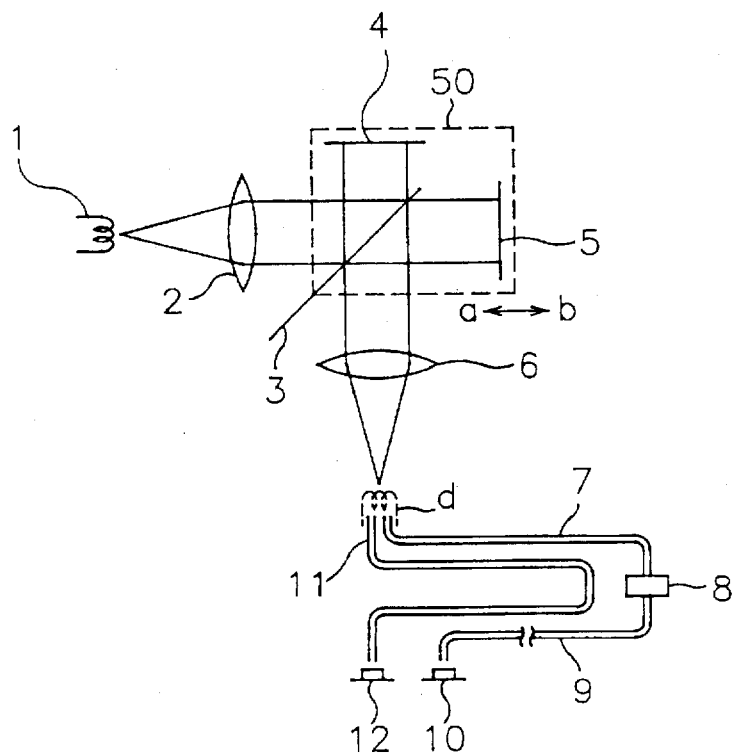
FIG. 2 is a diagram depicting another conventional Fourier transform type spectroscope.
Figure 3:
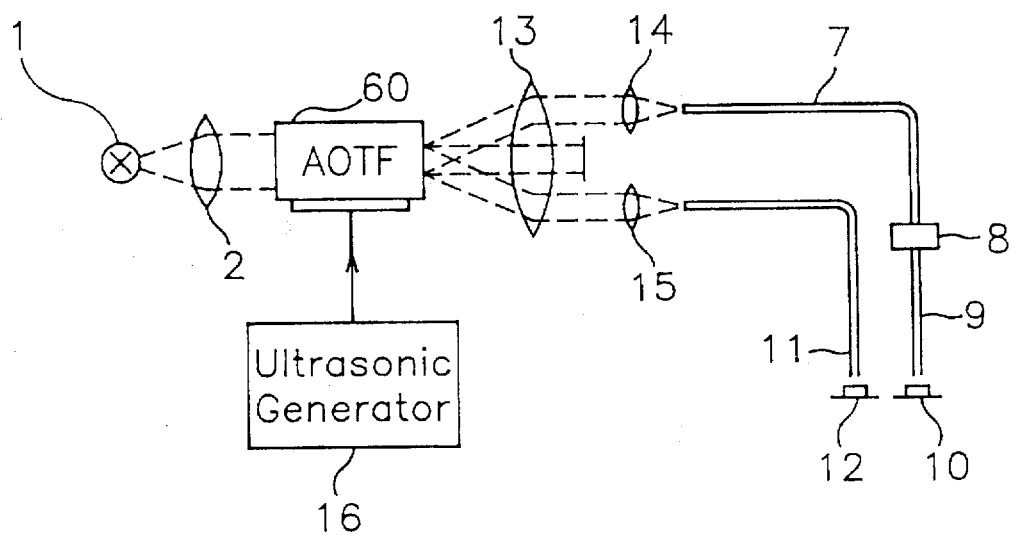
FIG. 3 is a diagram depicting a conventional spectroscope using an acousto-optical (AOTF) device.
Figure 4:
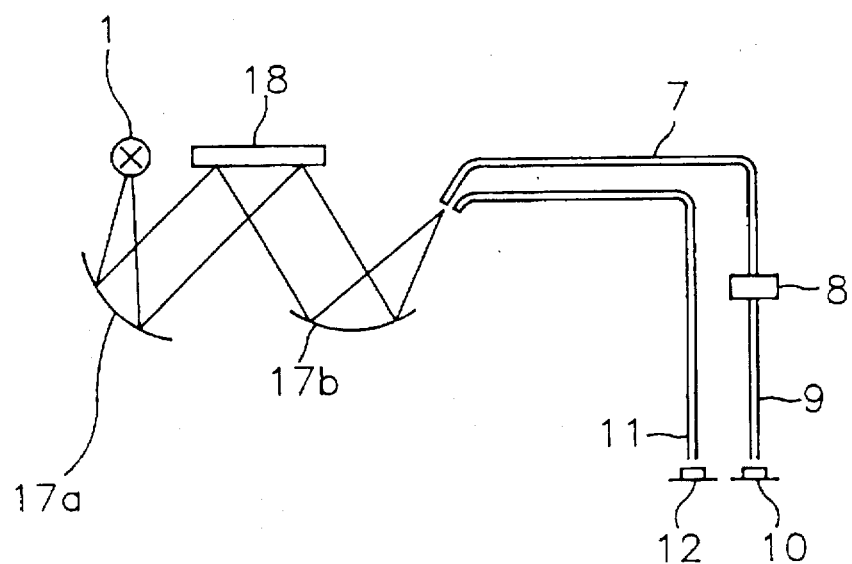
FIG. 4 is a diagram depicting a conventional spectroscope using a diffraction grating.
Figure 5:
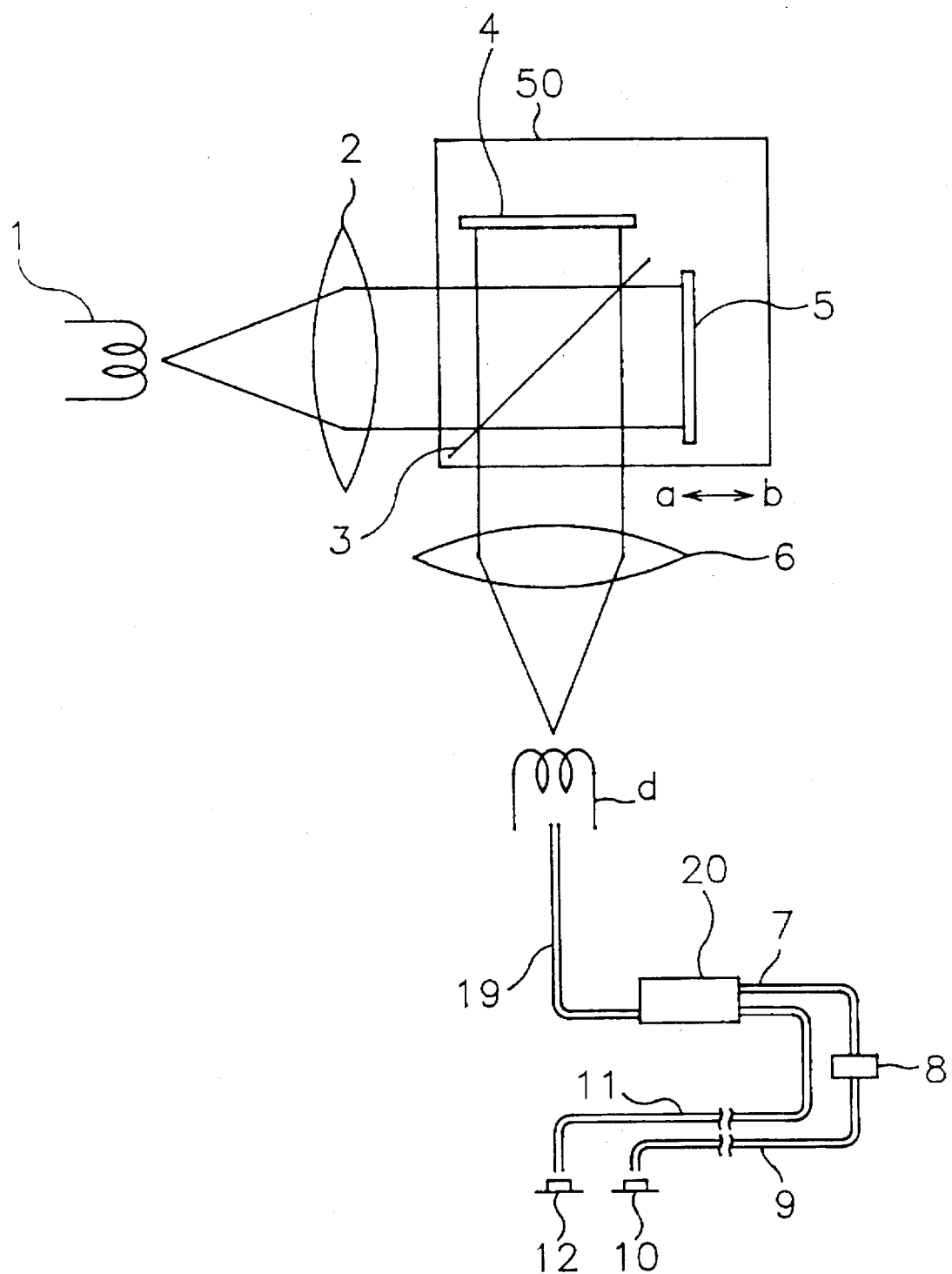
FIG. 5 is a diagram depicting an illustrative embodiment of the invention.

Turning to FIG. 5, which shows an illustrative embodiment of the invention, the same symbols shown in FIG. 2 are assigned to similar parts and description thereof is omitted hereat for sake of clarity of description. The difference between the arrangements of FIGS. 5 and 2 is in the addition of optical fiber 19 and optical coupler 20. Interference light from Michelson interferometer 50 is focused on part "d" to focus an image of light source 1 and is made incident on optical fiber 19 whose input end is arranged as shown. The interference light is divided into two light beams by optical coupler 20 and are made incident on optical fibers 7 and 11, respectively.

Figure 6:
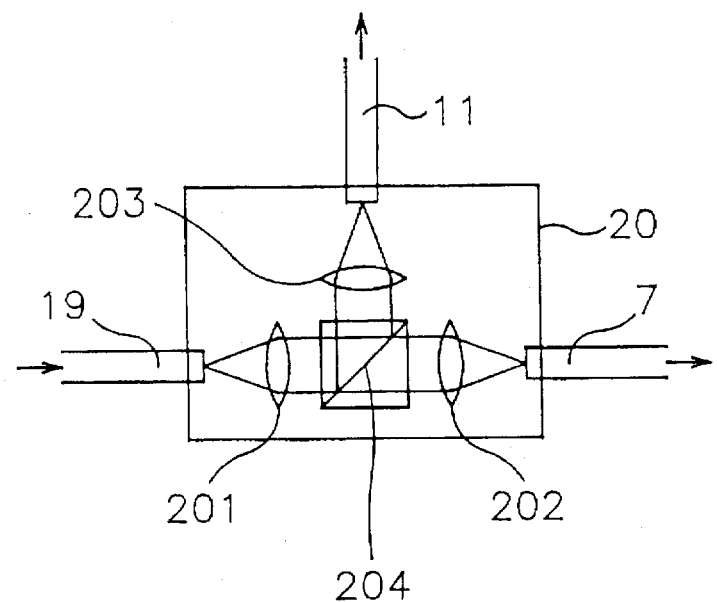
FIG. 6 is a diagram depicting an illustrative embodiment of an optical coupler used in the invention.

FIG. 6 shows an example of an illustrative optical coupler 20, wherein optical coupler 20 uses a half mirror 204. Outgoing light from optical fiber 19 is parallelized with lens 201 and is made incident on half mirror 204. Half mirror 204 transmits a part of the incident light and the transmitted light is focused with lens 202 and made incident on the end face of optical fiber 7. Also, light reflected from half mirror 204 is focused with lens 203 and is made incident on the end face of optical fiber 11.

Figure 7:
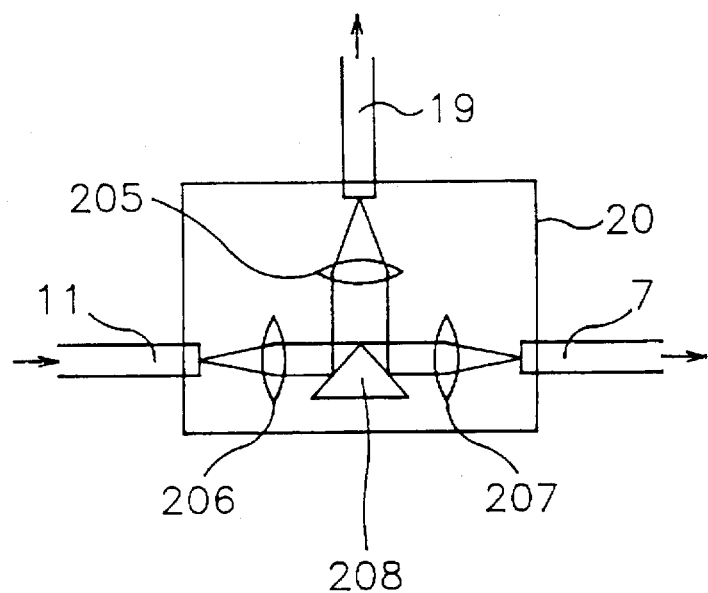
FIG. 7 is a diagram depicting another illustrative embodiment of an optical coupler used in the invention.

FIG. 7 shows another light coupler 20 which uses a right angle mirror 208. Outgoing light from optical fiber 19 is parallelized with lens 205 and is made incident on right angle mirror 208. Right angle mirror 205 reflects the left half of the incident light beam towards lens 206. This beam is focused with lens 206 and is made incident on the end face of optical fiber 11. Right angle mirror 208 reflects similarly the right half of the incident light beam towards lens 207. This light beam is focused with lens 207 and is made incident on the end face of optical fiber 7.

Figure 8:
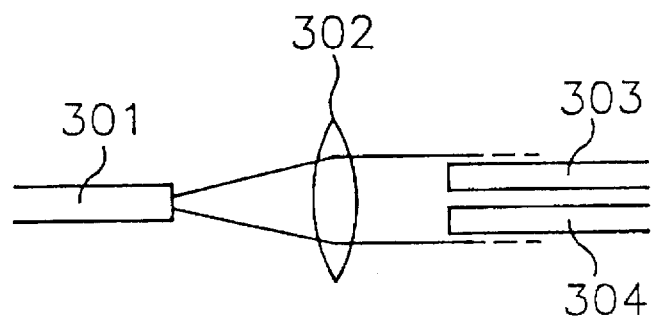
FIG. 8 is a diagram depicting a further illustrative embodiment of an optical coupler used in the invention.

FIG. 8 shows another type of optical coupler using a lens 302. Outgoing light from first optical fiber 301 is parallelized with lens 302 and then is made incident on second and third optical fibers 303 and 304.

In the embodiment of FIG. 5, the characteristics of light source 1 and optical fibers 19,7 and 9 are included, in addition to those of sample 8, in the spectrum of the measurement signal, which is detected by detector 10. On the other hand, the characteristics of light source 1 and optical fibers 19 and 11 are included in the spectrum of the reference signal, which is also detected by detector 12.

Since optical fiber 11 is located in the same path as optical fibers 7 and 9, optical fiber 11 and optical fibers 7 and 9 show identical characteristics. Thus, by dividing the spectrum characteristics of the measurement signal, obtained by detector 10, by those of the reference signal, obtained by detector 12, the environmental changes in optical fibers 19,7 and 9, can be compensated for.

The non-uniformity of interference light in position "d", which is caused by the tilting of the mirrors (which is due to temperature changes) and other adverse influences caused by various changes on the arrangement of FIG. 5, can be compensated for because the light is received by a single optical fiber, e.g. 19, disposed in position "d" and then divided, e.g. by optical coupler 20, into separate light beams for the measurement and reference signals. This arrangement is also similarly effective for compensating for the deterioration of the light source.

The invention is not limited to the foregoing embodiment. For example, as an optical coupler, those using generally available optical waveguides, and fusion splice optical fibers can also be used.

The invention can also be arranged so that the measurement and reference signals can be taken out by arranging optical fibers close to each other in the position of part "d", shown in FIG. 5, as indicated by the arrangement of FIG. 2, and by attaching optical couplers to each optical fiber. Through such an arrangement, multiple channel measurement can be made using an interferometer as a light source.

In addition, light quantities for measurement and reference signals need not be necessarily one for one. The light quantity involved in the measurement signal is attenuated by the sample and sample chamber. Accordingly, if the light quantity involved in the measurement signal is correspondingly increased, for example, by setting the light quantity ratio on the measurement and reference paths to be 2:1, the loss due to samples etc can be compensated for and a collectively higher signal to noise (S/N) ratio than the case for a ratio of 1:1, can be obtained.

Figure 9:
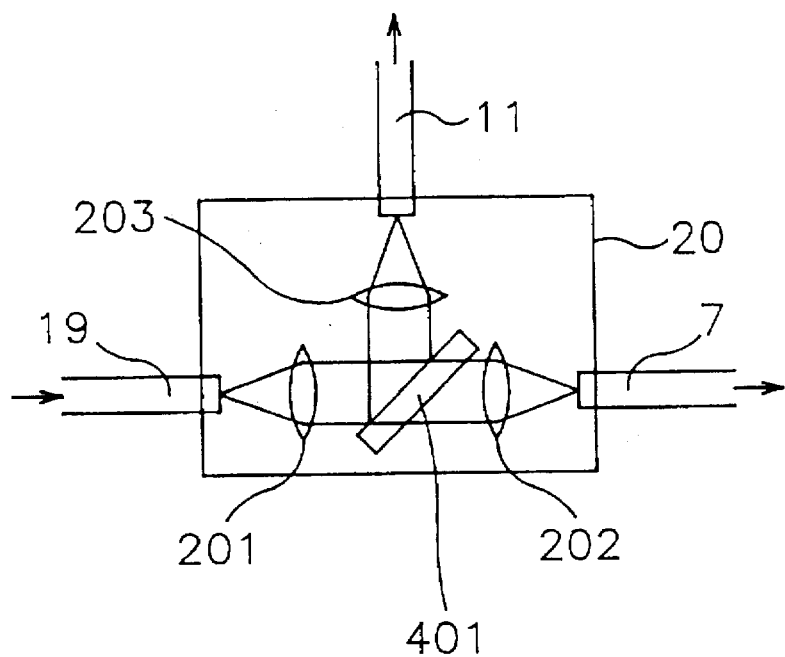
FIG. 9 is a diagram depicting a still further illustrative embodiment of an optical coupler used in the invention.

FIG. 9 shows another optical coupler that realizes this foregoing concept. Light from optical fiber 19 is separated by beam splitter 401 before being made incident on optical fiber 7 (i.e. in the sample path) and the divided light is made incident on optical fiber 11 (i.e. in the reference path). For a near infrared ray, a glass plate itself without metal film deposition by vacuum evaporation can be used because the surface reflection from the glass surface is about 4%.

This makes the signal light about 90% of the outgoing light from optical fiber 19 even when losses in the lens and other components, are taken into account, leading to an improvement in the S/N ratio.

If the light quantity in the reference path is small, for the reason that a decrease in light quantity in the measurement path mismatches the branching ratio, degradation of the S/N ratio will be prevented by e.g. lengthening of the integration time of the detection signal in the reference path only. This is because the integration time in the reference path, which can follow the temperature changes in the light source and optical fibers, is sufficient while that time in the measurement path must be determined to follow the changes in the sample. For example, for a sample flowing through a pipe line, which is to be controlled with a valve, it is desirable to have an integration response time of 1 to 10 seconds, while the time constant of a few to tens of minutes is sufficient for temperature changes in the light source and optical fibers in the reference path. That is, the integration time in the reference path can be several to tens of times that in the measurement path.

The above beam splitter may be made of quartz or calcium fluoride. A splitter, not utilizing surface reflection, but utilizing a thin film applied to its surface may be used, although durability becomes slightly lower. In addition, the ratio of the reference light to the measurement light is not limited to the above values, but it is sufficient that the light quantity in the reference path be smaller than the light quantity in the measurement path.

The invention, advantageously, provides accurate measurement without being affected by temperature and other changes in the interferometer part because the arrangement receives the outgoing interference light from a Michelson interferometer using a single optical fiber and the light therethrough is then branched into two optical fibers using an optical coupler so that a measurement path through one optical fiber and a reference path through another optical fiber are concurrently formed, and then the reference and measurement signals are detected and suitably processed to enhance the obtained output signal accuracy.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. In a spectroscope comprising a reference path using a first optical fiber comprising an input end and an output end and a measurement path using a second optical fiber comprising an input end and an output end with a sample chamber in said measurement path, the improvement comprising:
    a third optical fiber comprising an input end and an output end, said input end being located in a light path to said sample chamber;
    an optical coupler means connected to said input end of said first optical fiber, said input end of said second fiber and said output end of said third optical fiber and for separating light transmitted through said third optical fiber into two similar light beams for transmission through said first and second optical fibers, respectively, so that light beam transmitted through said second optical fiber is incident on said sample chamber; and
    detector means connected to said output end of said first optical fiber and to said output end of said second optical fiber for detecting output light beams from said first and second optical fibers, respectively, wherein said output light beam from said second optical fiber is a measurement light beam resulting from light being incident on said sample chamber, and output light beam from said first optical fiber is a reference light beam, and for processing said measurement light beam and said reference light so as to compensate for environmental changes and/or deterioration of light.

2. The spectroscope of claim 1, wherein said optical coupler means comprises a half mirror.

3. The spectrosocpe of claim 1, wherein said optical coupler means comprises a right angle mirror.

4. The spectroscope of claim 1, wherein said optical coupler means comprises a condensing lens or mirror.

5. The spectroscope of claim 1, wherein said optical coupler means comprises an optical waveguide.

6. The spectroscope of claim 1, wherein said optical coupler means comprises two optical fibers fused or mechanically adhered together in parallel.

7. The spectroscope of claim 1, wherein said optical coupler means comprises a beam splitter, and wherein quantity of light transmitted through said second optical fiber is greater than the quantity of light transmitted through said first optical fiber.

8. The spectroscope of claim 1, wherein said detector means has signal integration times different for signals detected from said first optical fiber and said second optical fiber.

9. A spectroscope comprising:
    a measurement optical fiber comprising an input end and and output end with a measurement sample disposed therebetween;
    a reference optical fiber comprising an input end and an output end;
    a light source for generating an output light;
    a first optical means for parallizing said output light from said light source and for producing a parallized output light;
    a Michelson interferometer to which said parallized output light from said first optical means is made incident and which outputs and output light;
    a second optical means for focusing said output light from said Michelson interferometer;
    a first optical fiber comprising an input end and an output end, said input end being located in a vicinity of a focal plane of said second optical means and within range of an image of said light soruce made on said focal plane;
    an optical coupler means connected to said output end of said first optical fiber, said input end of said reference optical fiber, and said input end of said measurement optical fiber, and for separating outgoing light from said first optical fiber into two similar light beams and for making said two light beams incident on said measurement and reference optical fibers, respectively, with a light beam being incident on said measurement sample in said measurement optical fiber; and
    detector means connected to said output end of said reference optical fiber and to said output end of said measurement optical fiber for detecting output light beams from said measurement optical fiber after being incident on said measurement sample and from said reference optical fiber, respectively, and for processing the two output light beams thereby to compensate for environmental changes and/or deterioration in said light source.

10. The spectroscope of claim 9, wherein said optical coupler means comprises a beam splitter, and wherein quatity of light transmitted through said measurement optical fiber is greater than the quantity of light transmitted through said reference optical fiber.

11. The spectroscope of claim 9, wherein said detector means has signal integration times different for signals detected from said reference and measurement optical fibers.

12. A spectroscope comprising:

a light source for producing an output light;

a first optical means for parallizing said output light from said light source;

a light processing means for producing an output light;

a second optical means for focusing said output light from said light processing means;

a measurement optical fiber comprising an input end and an end with a measurement sample disposed therebetween;

a reference optical fiber comprising an input end and an output end;

a first optical fiber comprising an input end and an output end, said input end being located in a vicinity of a focal plane of said second optical means and within reange of an image of said light source made on said focal plane;

an optical coupler means connected to said input end of said measurement optical fiber, said input end of said referece optical fiber, and said output end of said first optical fiber, for branching light from said first optical fiber into two similar light beams and for making said two light beams incident on said reference optical fiber and said measurement optical fiber, respectively, with one light beam being incident on said measurement sample in said measurement optical fiber; and means connected to said output end of said measurement optical fiber and to said output end of said reference optical fiber and for detecting output light beams from said measurement optical fiber and said reference optical fiber and for processing said output light beams so as to compensate for environmental changes and/or deterioration of said light source.

13. The spectroscope of claim 12, wherein said optical coupler means comprises a beam splitter, and wherein quantity of light transmitted through said measurement optical fiber is greater than the quantity of light tranmsitted through said reference optical fiber.

14. The spectroscope of claim 12, wherein said detector means has signal integration times different for signals detected from said reference and measurement optical fibers.

15. The spectroscope of claim 12, wherein said light processing means is one selected from the group consisting of an acousto-optical device, a diffraction grating, and an optical filter.

16. The spectroscope of claim 1, wherein further comprising means for processing signals obtained from said first and second optical fibers by said detector means so as to eliminate adverse effects caused by environmental changes.

17. The spectroscope of claim 9, wherein further comprising means for processing signals obtained from said measurement and reference optical fibers by said detector means so as to eliminate adverse effects caused by environmental changes.

18. The spectroscope of claim 12, wherein furthere comprising means for processing signals obtained from said measurement and reference optical fibers by said detector means so as to eliminate adverse effects caused by environmental changes.

* * * * *